Patented Sept. 29, 1942

2,296,963

UNITED STATES PATENT OFFICE 2,296,963

LEAD PIGMENT

Forrest L. Turbett and George J. Vahrenkamp, Joplin, Mo., assignors to The Eagle-Picher Lead Company, Cincinnati, Ohio, a corporation of Ohio No Drawing. Application August 30, 1939, Serial No. 292,679

8 Claims. (Cl. 106—297)

Our invention relates to a new lead pigment, its process of manufacture and to improved paints incorporating this pigment, and its object is to provide a pigment and paints made therefrom of markedly improved opacity and weathering characteristics as compared to other pigments and paints heretofore known or used.

It is well known that certain high hiding white pigments which are non-reactive in paint vehicles, such as titanium dioxide, extended titanium pigments, zinc sulfide and lithopone are seldom used alone in outdoor paints due to their tendency to chalk or break away from the dry paint vehicle under the disintegrating action of the elements, while chemically active pigments such as basic carbonate white lead, basic sulfate white lead, leaded zinc oxide and zinc oxide are almost always used because of their slow chalking and long outdoor life. Where high hiding outdoor paints are required, it is the usual practice in compounding such paints to blend an inert high hiding pigment with one or more of the active low hiding pigments. This tends to dilute the paint and diminish its effective outdoor life. In carrying out experiments we have found that a high hiding compound, ordinarily inert in a paint film, may be combined with a suitable lead compound so that the outdoor life instead of being reduced is lengthened.

In our co-pending application, Serial Number 291,378, filed August 22, 1939, entitled "Lead pigment," we have described and claimed a series of new compounds comprising lead oxide and silicon dioxide with or without combined water, which, when used in paint, possess the highly desired property of imparting to a dried paint film a toughness and long life which is much desired, but heretofore unknown in the paint industry. These compounds differ materially in composition, structure and properties from known compounds of lead oxide and silicon dioxide which have been precipitated from solution in that they have low combined water content, proper pigment particle size and shape, together with strong light refracting powers. They are chemically analogous to the carbonate and sulfate series of white lead compounds, but they differ from these compounds in that they are more basic and more reactive chemically, and have an amorphous particle structure.

In carrying out experiments we have discovered that by combining a high hiding pigment such as titanium dioxide with our lead oxide-silicon dioxide compound at the proper stage in the manufacturing process we are enabled to produce a uniform, high hiding, oil reactive white pigment characterized by properties heretofore unknown in the pigment field. We have found that by triturating in water slurry a mixture of titanium dioxide with our lead oxide-silicon dioxide compound there is a resulting reaction whereby we are enabled to produce a compound having characteristics heretofore unknown and highly desired in the art. By this means we are enabled to produce a pigment with a pH in a distilled water slurry from 9.0 to 11.8 which is higher than the pH of the corresponding lead oxide-silicon dioxide compounds to which no titanium dioxide has been added. We believe this increase in pH indicates that titanium dioxide has reacted chemically with the lead oxide-silicon dioxide compound, although the reaction is not clearly understood. The X-ray diffraction pattern of the titanium in the new lead oxide-silica-titanium dioxide compound either completely disappears or is dimmed to a point where it is barely visible which we interpret as further evidence of chemical change.

Upon comparing the weathering properties of paints made from our improved pigment with paints of similar composition, the pigment portion of the latter being compounded by blending dry lead oxide-silicon dioxide compound with dry titanium dioxide, we find that after six months outside exposure at 45° south the paint containing the dry blend shows chalking at a rate normally to be expected with a slight loss of film gloss, while paints containing our new improved pigment show only a faint trace of chalking with practically no loss of gloss. In paints compounded with our new and improved pigment to which a tinting color has been added, we find a markedly improved tint retention.

Under the microscope at 2000 diameters our new pigment appears as irregular fuzzy edged, amorphous particles with occasionally a vitreous, sharp edged particle visible in the field. In those cases where the silica content of our new compound is relatively high, as for example 25 to 30%, we find greater numbers of vitreous particles visible. While in those cases where the silica is lower the same particles are absent and all of the initial lead oxide-silicon dioxide compound appears to have been reacted during the manufacturing process.

In the production of our new product we may select a lead compound or compounds such as litharge, lead sulfate or leady litharge, and blend it in the desired proportions with finely ground silica sand after which the whole is fused, whereupon the melt is granulated by running into water and the granular lead oxide-silicon dioxide compound, together with the desired amount of titanium dioxide or other high hiding compound is charged into suitable apparatus, which may be a ball mill, where the whole is ground in water to effect the desired chemical reaction and reduce the particles to the desired size. At this stage of the process we may add a small quantity of acetic acid or other acid which will react with lead silicate to form a soluble salt of lead. This causes a strong dispersing effect upon the pigment and tends to catalyze the chemical reaction, at the same time reducing the quantity of water required for proper grinding. The resulting hydrosol slurry is then removed from the mill after which it is flocculated by removing the soluble lead salt through the addition of a small quantity of precipitating agent such as sulfate or carbonate. The resulting stiff paste is then dried and pulverized.

By way of example, we may fuse together 1700 pounds of lead monoxide and 300 pounds of silica sand in a reverberatory furnace at a temperature of approximately 1800° F. When the fusion is complete the fluid compound is allowed to run from the furnace into a large volume of water. The granular material is then placed in water. The granular material is then placed in a Porox or porcelain lined ball mill, charged with a Porox or porcelain balls, and approximately 667 pounds of titanium dioxide, four pounds of glacial acetic acid, and 2000 pounds of water are added. The whole is ground for approximately 24 hours during which time the reaction is completed, the pigment being reduced to an extremely finely divided condition.

The slurry is then pumped from the mill to an agitator tub, where 3.37 pounds of a calcium carbonate are added. The mixture is agitated for 30 minutes, after which it is transferred from the tub to a drier. The drying temperature may vary from 200° to 850° F., since the pigment is not appreciably heat sensitive. However, we find by controlling the temperature at which the pigment is dried that its properties and composition may be altered. For example, when dried at the higher temperatures the oil absorption is lowered and the pigment loses a part or all of its combined water. After drying the pigment is pulverized and is ready for market.

The percentage compositions of our new pigments may be varied at will to produce almost any specific pigment property desired. For example, if we desire a higher oil absorption pigment, we may raise the lead oxide content. If a lower oil absorption type is required we raise the silica and lower the lead oxide content. By varying the titanium dioxide content, the hiding power is changed to suit almost any requirement.

By way of example, we give the analysis and specific gravity of three pigments produced by our process:

| %PbO | %SiO₂ | %TiO₂ | %H₂O | Sp. gravity |
|---|---|---|---|---|
| 76.4 | 9.98 | 9.70 | 3.92 | 6.25 |
| 56.1 | 9.85 | 28.25 | 5.80 | 5.07 |
| 51.0 | 17.00 | 29.20 | 2.80 | 4.78 |

We have found that by varying the drying temperature we are enabled to control the oil absorption of the finished product to an appreciable degree without in any manner lessening the pigment properties of the finished product. The higher the temperature range the more complete is the elimination of combined water and the lower the oil absorption of the lead oxide-silicon dioxide titanium dioxide compound. In carrying out the experiments we have found that by using a temperature of approximately 850° F. substantially all the combined water is eliminated, in which case we are enabled to reduce the oil absorption appreciably below that of a product dried at lower temperatures.

Having thus described our invention, what we claim as new and desire to secure by Letters Patent is:

1. A pigment compound comprising lead oxide, silicon dioxide, titanium dioxide and water, formed by first reacting fused anhydrous lead silicate with water and then reacting the hydrated lead silicate thus formed with titanium dioxide.

2. A pigment compound comprising a lead oxide-silica-titanium dioxide compound formed by reacting titanium dioxide with the product of hydration of a fused compound of lead oxide and silicon dioxide.

3. A pigment compound of the system

formed by wet milling titanium dioxide with the product of hydration of a fused compound of lead oxide and silicon dioxide.

4. A pigment comprising the reaction product formed by first reacting fused anhydrous lead silicate with water and then reacting the hydrated lead silicate thus formed with titanium dioxide, having a PbO content varying from 51 per cent to 76 per cent by weight, a silicon dioxide content varying from 9.98 per cent to 17 per cent by weight, a titanium dioxide content varying from 9.70 per cent to 29 per cent and a water content varying from 2.80 to 5.80 per cent by weight.

5. A paint comprising the pigment of claim 1 admixed with a paint vehicle.

6. A paint comprising the pigment of claim 2 admixed with a paint vehicle.

7. A paint comprising the pigment of claim 3 admixed with a paint vehicle.

8. A pigment compound comprising lead silicate, titanium dioxide and water formed by reacting anhydrous fused lead silicate with titanium dioxide in the presence of water.

FORREST L. TURBETT.
GEORGE J. VAHRENKAMP.